(12) United States Patent
Kumhyr et al.

(10) Patent No.: US 10,977,620 B2
(45) Date of Patent: Apr. 13, 2021

(54) CALENDARING DEPENDENCIES

(71) Applicant: INTERNATIONAL BUSINESS MACHINES CORPORATION, Armonk, NY (US)

(72) Inventors: David B. Kumhyr, Austin, TX (US); Krishna K. Yellepeddy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 393 days.

(21) Appl. No.: 15/427,268

(22) Filed: Feb. 8, 2017

(65) Prior Publication Data
US 2018/0225636 A1   Aug. 9, 2018

(51) Int. Cl.
*G06Q 10/10* (2012.01)
*H04N 7/15* (2006.01)

(52) U.S. Cl.
CPC .......... *G06Q 10/1095* (2013.01); *H04N 7/15* (2013.01)

(58) Field of Classification Search
CPC ...... G06Q 10/1095; G06Q 10/10; H04N 7/15; H04M 2203/5054; H04M 2203/5009; H04M 2203/352; H04L 12/1822; H04L 9/32; H04W 12/0608; Y10S 707/927
See application file for complete search history.

(56) References Cited

U.S. PATENT DOCUMENTS

| | | | |
|---|---|---|---|
| 7,679,518 B1 * | 3/2010 | Pabla | G06Q 10/109 340/309.16 |
| 2004/0103150 A1 * | 5/2004 | Ogdon | H04L 12/5692 709/205 |
| 2006/0224430 A1 * | 10/2006 | Butt | G06Q 10/063116 705/7.16 |
| 2007/0005409 A1 | 1/2007 | Boss et al. | |
| 2008/0059265 A1 | 3/2008 | Biazetti et al. | |
| 2009/0089133 A1 | 4/2009 | Johnson et al. | |
| 2011/0154204 A1 * | 6/2011 | Narayanaswamy | H04N 7/15 715/727 |
| 2012/0203833 A1 | 8/2012 | Faulbacher et al. | |

(Continued)

OTHER PUBLICATIONS

Adobe Systems Incorporated "Adobe Connect Help / Creating and managing seminars" Publication Date: Feb. 4, 2016; retrieved from https://helpx.adobe.com/adobe-connect/using/creating-seminars.html; 12 pgs.

*Primary Examiner* — Mehmet Yesildag
*Assistant Examiner* — Ayanna Minor
(74) *Attorney, Agent, or Firm* — Cantor Colburn LLP; Noah Sharkan

(57) ABSTRACT

Embodiments include a technique for scheduling meeting based on calendaring dependencies. The technique includes receiving prerequisite information for scheduling a meeting, the prerequisite information including a meeting agenda, meeting objective, and location, and validating, by a computing system, the prerequisite information based on an aggregate condition of the prerequisite information. The technique also includes responsive to the validation, scheduling the meeting based on the prerequisite information, otherwise restricting the scheduling of the meeting, and electronically transmitting a meeting request including the prerequisite information based on the validation.

10 Claims, 3 Drawing Sheets

(56) References Cited

U.S. PATENT DOCUMENTS

| | | | |
|---|---|---|---|
| 2012/0311460 A1* | 12/2012 | Boyd | G06Q 10/10 |
| | | | 715/752 |
| 2014/0372162 A1* | 12/2014 | Dhara | G06Q 10/1095 |
| | | | 705/7.19 |
| 2015/0193739 A1 | 7/2015 | Min et al. | |
| 2016/0092578 A1* | 3/2016 | Ganani | G06F 16/9535 |
| | | | 707/728 |

* cited by examiner

Create Meeting 300

| | |
|---|---|
| Meeting Type: | Consensus |
| | Agenda: http://support.mozilla.org.en-US/kb/filelink-large-attachments |
| Date: | 07 Dec 17 |
| | Location: 888-555-1212 Code: 234 567 509 |
| Start Time: | 01:00 PDT |
| | Duration: ⟶ 15 minutes |
| Objective: | Approval of the zNewOneTwoProject |
| Materials: | http://support.mozilla.org.en-US/kb/filelink-large-attachments For project |
| Assignment: | Have a decision, or objections with reasons |
| Facilitator: | Amanda Smith |
| Invitees: | Josiah |
| | Abigail |
| | Lucy |
| | Mercy |
| | John |
| | William |

Condition and Status:
Invitee has a prior meeting that ends at the start of this meeting.

The meeting is scheduled at the end of business hours.

Presence shows this invitee is travelling and is out during business hours

FIG. 3

CALENDARING DEPENDENCIES

BACKGROUND

The present invention relates to organizing meetings, and more specifically, to scheduling based on calendaring dependencies.

In today's enterprise environment, meetings and conferences are important to facilitate business collaborations and decisions. Whether meetings are scheduled in-person or virtually, business calendars and workload schedulers are an integral part of organizing meetings. Currently, schedulers have the ability to organize meetings for several participants with only an email address. With access to enterprise members' calendars, schedulers have the ability to locate unscheduled blocks of time to schedule meetings. As businesses expand globally, efficient scheduling of meetings is critical.

SUMMARY

According to a first embodiment, a computer-implemented method for scheduling meetings based on calendaring dependencies is provided. The computer-implemented method includes receiving prerequisite information for scheduling a meeting, the prerequisite information including a meeting agenda, meeting objective, and location, and validating, by a computing system, the prerequisite information based on an aggregate condition of the prerequisite information. The computer-implemented method also includes responsive to the validation, scheduling the meeting based on the prerequisite information, otherwise restricting the scheduling of the meeting, and electronically transmitting a meeting request including the prerequisite information based on the validation.

According to another embodiment, a system for scheduling meetings based on calendaring dependencies is provided. The system includes a storage medium, the storage medium being coupled to a processor, where the processor is configured to receive prerequisite information for scheduling a meeting, the prerequisite information including a meeting agenda, meeting objective, and location, and validate, by a computing system, the prerequisite information based on an aggregate condition of the prerequisite information. The system also includes the processor being configured to respond to the validation, schedule the meeting based on the prerequisite information, otherwise restricting the scheduling of the meeting, and electronically transmit a meeting request including the prerequisite information based on the validation.

According to a different embodiment, a computer program product for scheduling meetings based on calendaring dependencies is provided. The computer program product includes a computer readable storage medium having stored thereon first program instructions executable by a processor to cause the processor to receive prerequisite information for scheduling a meeting, the prerequisite information including a meeting agenda, meeting objective, and location, and validate, by a computing system, the prerequisite information based on an aggregate condition of the prerequisite information. The instructions are further configurable to cause the processor to respond to the validation, schedule the meeting based on the prerequisite information, otherwise restrict the scheduling of the meeting, and electronically transmit a meeting request including the prerequisite information based on the validation.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3 illustrates an example user interface for calendaring dependencies in accordance with an embodiment.

DETAILED DESCRIPTION

In accordance with exemplary embodiments of the disclosure, methods, systems and computer program products for calendaring dependencies are provided.

Current schedulers allow meeting organizers to easily schedule meetings without giving any meaningful thought on the purpose and necessity for holding the meeting. Issues may arise where key business personnel are pulled out of important meetings or conflicted out of other meetings without really considering if it is necessary to do so. Minimum information is required for scheduling a meeting. For example, in a business enterprise setting all that is needed is the user's email addresses. Meeting organizers are able to freely schedule meetings without doing further research.

Because the schedulers only have limited information, they are likely to stack meetings one after another with the intent of facilitating efficiency. The close scheduling of meetings does not necessarily increase the productivity or the quality of the meetings. For instance, meeting invitees may attend multiple meetings rushing from one place to the next. Information received from one meeting may be confused with information received from another meeting because there is no time to organize and debrief the information from the first meeting. In order to facilitate efficiency, a configurable grace period can be used between the scheduling of meetings.

Often times meeting organizers schedule meetings in blocks of 30 or 60 minute increments. Situations may arise when meetings can be completed in 15 minutes or less. Alternatively, instead of coordinating a meeting a quick phone call can resolve an existing issue obviating the need for scheduling a meeting. The excess time that is marked available in a user's calendar may not indicate the actual status of the user due to the unneeded extended time. In addition, a meeting organizer may be unable to schedule the user for a different meeting due to the appearance that the user is busy when the time can be used for some other productive business purpose. In an embodiment, the system is configured to restrict the scheduling of long meetings (i.e. 15 minutes) due to meetings being commonly overscheduled.

The technique described herein requires the consideration of additional factors such as meetings scheduled before and after a scheduled meeting. Also, other logistics, precursor data from meeting organizers, and preference data from the meeting attendees are considered when scheduling meetings. A mechanism to restrict the ability to freely schedule meetings is implemented to prevent the overscheduling and close scheduling of meetings. The restrictive mechanism requires the meeting organizer to provide all of the prerequisite information and meet the criteria prior to being eligible to schedule the meeting and transmit the meeting request. The additional information facilitates the efficient scheduling of meetings and also increases the quality of each meeting.

Figure 1:
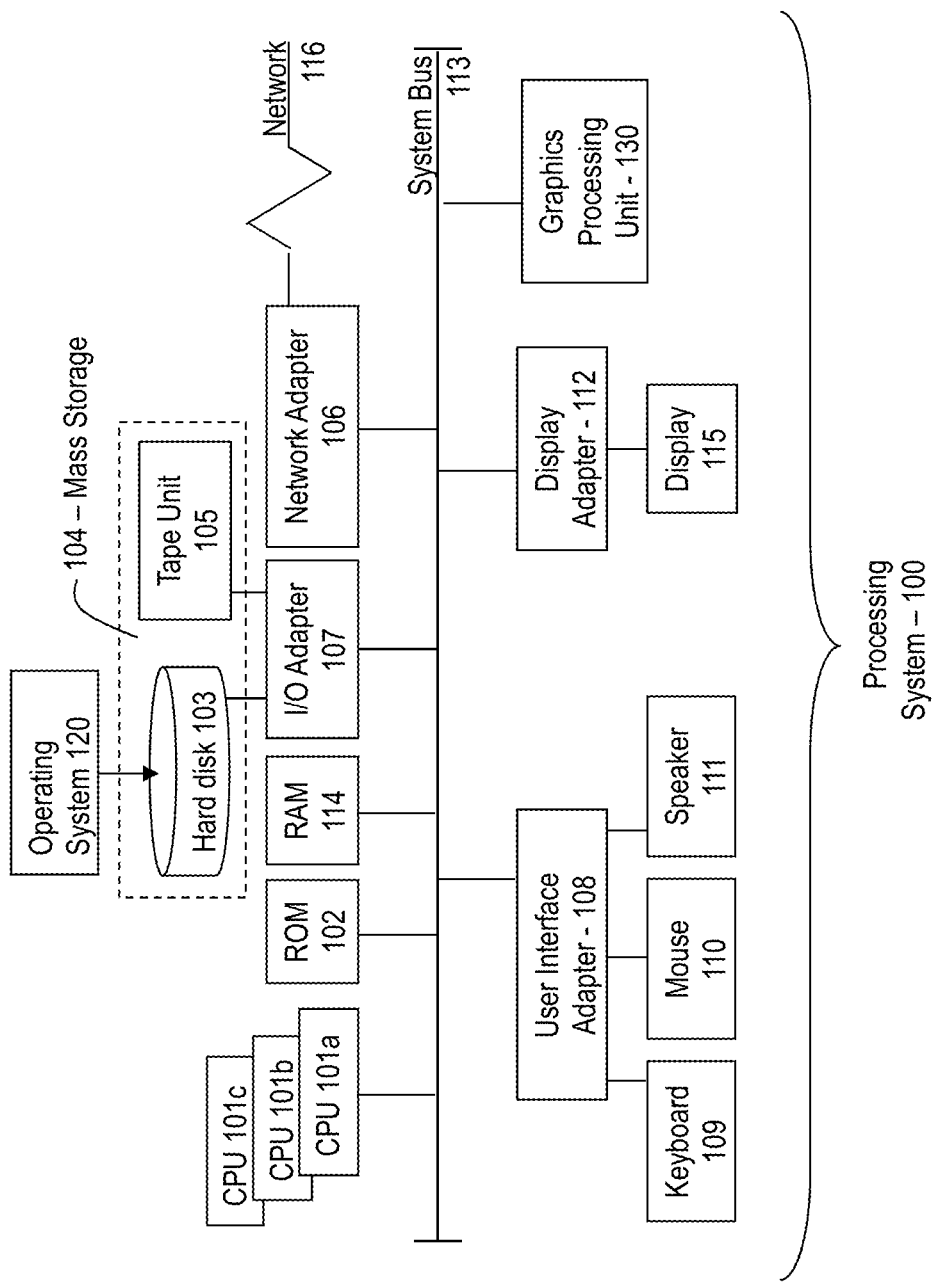
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
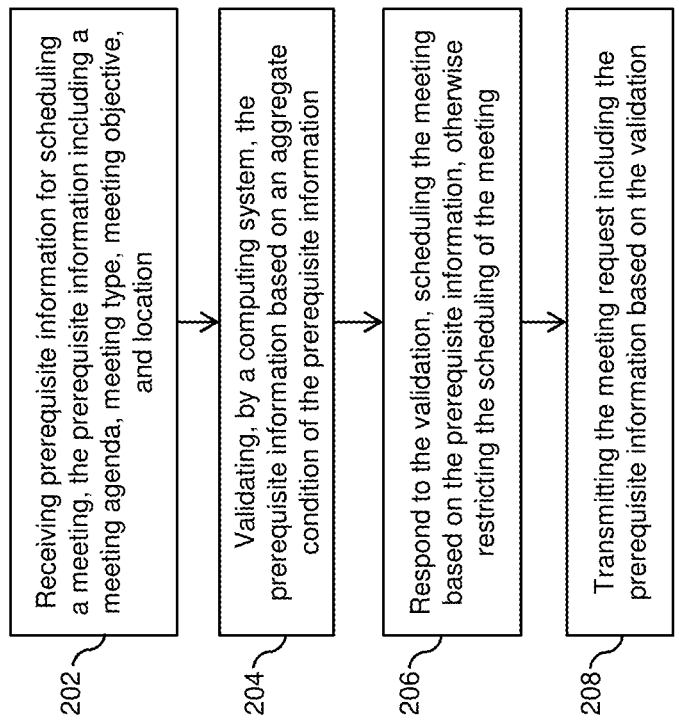
FIG. 2 is a flow diagram for a method of calendaring dependencies in accordance with an embodiment.

Now referring to FIG. 2, a flow chart illustrating a method 200 for scheduling meetings based on calendaring dependencies is shown. Block 202 provides receiving prerequisite information for scheduling a meeting, the prerequisite information including a meeting agenda, meeting type, meeting objective, and location. In one or more embodiments, a meeting organizer enters the prerequisite information in the computing system using a user interface (UI). A meeting agenda can include the times and sequence of various topics associated with the meeting. As a non-limiting example, meeting types can include consensus, information dissemination, assignments, idea generation, and others. The meeting objective can provide a few words describing the purpose and goals of the meeting. For example, a meeting objective can include the approval of a specific project.

In an embodiment, the location information includes the physical location. In another embodiment, the location information includes conference joining information such as dial-in numbers, participant code, and log-in credentials. The joining information can also include a web conference address and log-in credentials.

Block 204 provides validating, by a computing system, the prerequisite information based on an aggregate condition of the prerequisite information. In one or more embodiments, the computing system validates the information it has received for scheduling a meeting. The validation process includes the computing system determining if any piece of the pre-requisite information has not been received or left blank. The computing system also determines whether "not applicable" (N/A) has been provided for prerequisite information. In this scenario, the prerequisite information is not validated and the meeting is not eligible for scheduling. In another example, the computing system will not accept an "x" or some other irrelevant information being provided as prerequisite information. The validation can also check to ensure proper files or links have been included. During the validation phase, the system validates the information of each of the fields. Schedulers will be required to determine valid information for entry into the GUI.

Block 206 provides response to the validation, scheduling the meeting based on the prerequisite information, otherwise restricting the scheduling of the meeting. If the computing system validates each piece of prerequisite information, the meeting is eligible for scheduling. In one or more embodiments, a meeting organizer can enter the prerequisite information into a UI where the computing system processes the information to determine whether to validate the scheduling of the meeting. Otherwise, a resistance to scheduling the meeting is provided based on the aggregate conditions of the prerequisite information (preparation, meeting times, and other factors). The aggregate condition must include a valid entry for each portion of the prerequisite information or the meeting cannot be scheduled.

Block 208 provides an electronic transmission a meeting request including the prerequisite information based on the validation. In one or more embodiments, a meeting request including the prerequisite information is transmitted to the invited users. For example, the meeting request presents the validated prerequisite information to the invited participant.

In one or more embodiments, the prerequisite information includes meeting duration, meeting facilitator information, required participants, location, and log-in credential information. In an embodiment, a meeting duration can be set by the meeting organizer but is limited to a maximum threshold. For example, a maximum threshold is configured to 15 minutes. The maximum threshold is set to a short period to restrict the ability of the meeting organizer to set longer meetings without justifying the need for a longer meeting. Many times default blocks of time are selected by meeting organizers without determining if that amount of time is actually necessary for completing the meeting.

In a different embodiment, the meeting duration can be extended beyond the maximum threshold duration based on the meeting agenda and the meeting objective. For example, if the meeting objective provides for a complex design collaboration and the meeting agenda outlines how each increment of time is to be used, the system can allow a longer meeting beyond the maximum threshold duration of 15 minutes. However, in the event the meeting agenda is blank, or is unrelated, or has an unexplained gap in time, the validation fails and the meeting is ineligible for scheduling.

In one or more embodiments, the maximum threshold duration is a configurable threshold. A system operator or programmer, who is not the meeting organizer, can have access to change the configuration for the maximum threshold duration. The meeting organizer is unable to configure the maximum threshold duration to maintain the integrity of the scheduling system.

In one or more embodiments, the prerequisite information includes a meeting facilitator. The meeting facilitator is responsible for leading the meeting to ensure the topics of the meeting agenda are covered in a timely manner. In the event, a meeting facilitator is not designated the meeting organizer is indicated as the meeting facilitator and will be responsible for leading the meeting. In one or more embodiments, the meeting facilitator can be validated based on information in the meeting facilitator's business profile and the meeting objective. For example, if the meeting objective is a budget meeting and the chief financial officer has an enterprise profile indicating her association with finances and budgeting stored in a location accessible by the computing system, the computing system can compare the association between the meeting objective and the profile of the named facilitator. If they are determined to match, the system can validate this portion of the prerequisite information.

In one or more embodiments, the prerequisite information includes location information. In one embodiment, the location information can provide a physical location such as a conference room located on the campus of an enterprise. The computing system can check the availability of the conference room in the event the reservation information is assessable. If the conference room is available during the time period of the proposed meeting, this portion of the prerequisite information can be validated. Otherwise, the location information is invalidated. In a different embodiment, the location information can include web-conference or teleconference information. In an embodiment, the meeting organizer is required to provide the log-in credentials or the validation will fail. In this scenario, the computing system can check the conference log-in credentials and ensure that they are valid by performing a test connection. If the computing system determines the information is complete and correct, the location prerequisite information is determined to be valid.

In an embodiment, the meeting scheduler is forced to shorten the meeting duration, schedule the meeting at the most convenient time for the required participants (not at a convenient time for the meeting scheduler), and perform the necessary pre-work prior to scheduling the meeting. It is considered to be within the scope of this disclosure that different prerequisite information and different combinations of prerequisite information can be used based on the needs of the enterprise.

Now referring to FIG. 3, a user interface (UI) 300 for calendaring dependencies in accordance with an embodiment is shown. In an embodiment, the UI 300 can be used by a meeting facilitator for generating and scheduling meeting requests. The UI 300 displayed in FIG. 3 is a non-limiting example and includes several fields where data can be entered by a meeting organizer. The information required for organizing and scheduling meetings include date information, time information, duration information, location information, etc. In one or more embodiments, the computing system is capable of validating the information that has been entered into each field.

In one or more embodiments, a "Meeting Type" can be entered. As a non-limiting example, meeting types can include consensus, information dissemination, assignment, idea generation, and others. The "Meeting Type" can provide the users with information to prepare the users for the meeting. In one or more embodiments, the meeting type is a prerequisite field for scheduling the meeting. The meeting type is required to prevent the meeting organizer from scheduling the meeting without identifying the purpose of the meeting.

A meeting time and start time are required fields. The computing system is responsible for validating the meeting type with the users' schedules. In one or more embodiments, the computing system prohibits the scheduling of meeting immediately before or immediately after an existing scheduled meeting or period of unavailability. A grace period can be configured to prevent the scheduling of back-to-back meetings without giving the participants a default period of time to debrief information from a prior meeting and prepare for subsequent meeting. In an example, a 15 minute grace period can be used. In one or more embodiments, the time zone of each participant can be considered. In addition, the various calendars and national holidays that are recognized in different geographic regions can be used to determine businesses are operating during normal hours can be considered.

In one or more embodiments, the "Objective" field can be provided. This information provides information regarding the subject matter of the meeting. In one or more embodiments, a meeting agenda is required for scheduling a meeting. The meeting facilitator or meeting organizer can establish a defined agenda to ensure the meeting stays on schedule. In one or more embodiments, a link to the meeting agenda can be provided in "Agenda" information field. In the event the meeting organizer provides a link to the meeting agenda, the computing system is capable of checking the link to ensure the meeting agenda is related to the meeting type and/or meeting objective. For example, keywords can be matched between the content of the agenda and the meeting type/objective. In the event, the meeting agenda field is blank, invalid, or the content of the agenda is blank, irrelevant, or undecipherable, the computing system will not validate the agenda and a meeting request will be unable to be generated.

In one or more embodiments, a "Location" field requires the physical location for the meeting or joining information, such as dial-in conference number and participant identification required for a conference. In an embodiment, the meeting request cannot be transmitted to the identified participants without the location information. This prevents the participants from receiving a meeting request with incomplete information. For example, participants will not be faced with searching for dial-in information for a teleconference where the dial-in number and participant code was not originally provided in the meeting request. The meeting organizer is responsible for determining where the location and participant information (log-in credential) information that is required for a meeting. In a different embodiment, after the location information has been entered, the computing system can perform a check to determine if the location is available. If log-in information for a web or teleconference has been provided, the computing system can perform a test to the website or conference to determine whether the number is valid. In addition, the system can store previous websites and teleconference credentials to determine whether valid credentials have been provided.

The meeting duration can be configured by the meeting organizer in the UI for setting the meeting duration. In an embodiment, the duration can be set in the UI as a sliding scale. In a different embodiment, the meeting duration is configured with a maximum threshold for a short duration (i.e. 15 minutes). In order for the meeting organizer to exceed the maximum threshold the additional time must be justified prior to the computing system validating the additional time. For example, the duration may exceed the threshold time based on the computing system analyzing the details of the meeting agenda. In another example, the meeting objective can indicate the time needed. In another embodiment, meeting types and meeting objectives can be stored over a period of time to indicate the average duration of a meeting having similar characteristics. If the meeting is to exceed the threshold, then the meeting organizer will be forced to justify the additional time through the system. In a different embodiment, the meeting organizer can schedule a meeting for a duration less than the maximum threshold without resistance from the system, if the remaining prerequisite information has been validated.

In one or more embodiments, assignments and pre-work can be provided in UI to ensure the participants are prepared for the meeting. In one or more embodiments, as the meeting organizer provides assignment information into the entry field, the computing system can validate the information. For example, documents can be analyzed by the system to determine whether the documents are related to meeting objective/purpose. In an embodiment, a keyword search and match can be used to determine the relevance. In the event the computing system is unable to determine whether the files or documents are relevant, the meeting organizer can be flagged or the assignment information will not be validated. In this event, the meeting organizer will be unable to schedule the meeting. For example, documents and files are analyzed by the computing system prior to the meeting, and a plug-in and/or download that is required for the meeting can be analyzed and provided to each user. In one or more embodiments, the above information can be transmitted in the generated meeting request. The assignments can increase the quality of the meeting by ensuring any pre-work is included and completed prior to the meeting.

In one or more embodiments, a facilitator can be designated in the UI if different than the meeting organizer. Otherwise, the meeting organizer is the default facilitator. Prior to scheduling a meeting, the required participants must be determined. In an embodiment, a meeting will not be scheduled unless all of the required participants are available. For example, if a business unit needs to have a meeting the CFO of the corporation may be a required participant. Auxiliary participants may be scheduled for the meeting, however, the unavailability of auxiliary participants will not prohibit the scheduling of the meeting.

Presence information for the participants can be used to determine when a user is generally available. In an embodiment, a participant's average daily schedule is based on a daily average for a period of time such as a week or a month. The participant's average daily schedule may be different than an enterprise's generic work schedule. The presence information can be used for scheduling meetings.

The sample UI 300 also displays "condition and status" information associated with each user as the meeting organizer is scheduling the meeting. For example, the status "Invitee has a prior meeting that ends at the start of this meeting," "The meeting is scheduled at end of business hours," "Presence shows this invitee is traveling and is out of business hours," and the like can be displayed. If the status affects a required participant, the meeting will not be scheduled. In one or more embodiments, conflicting participants can be prompted for a real-time negotiation with the meeting organizer to determine an available time for scheduling. The "conditions and status" information can clue the meeting organizer to which invitee's schedule is not agreeable with the proposed meeting time. For example, the proposed meeting time may be immediately adjacent with another meeting, the proposed meeting may be outside of business hours, or the presence information may indicate a participant is traveling.

In one or more embodiments, historical information regarding the combination of meeting times, duration, meeting objectives, etc. can be stored and used to optimize the validation of scheduling meetings.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for calendaring dependencies, the computer-implemented method comprising:
receiving prerequisite information for scheduling a meeting, the prerequisite information including a meeting agenda, meeting objective, and location;
identifying one or more participants having conflicting schedules for the meeting;
prompting the one or more participants having conflicting schedules for the meeting with a real-time negotiation to determine an available time period for scheduling the meeting;
validating, by a computing system, the prerequisite information based on an aggregate condition of the prerequisite information;
designating a location of the meeting as a conference;
receiving log-in credentials associated with the conference;
wherein the validation comprises validating, by the computer system, the conference by performing a test connection using the log-in credentials prior to transmitting a meeting request;
responsive to the validation, scheduling the meeting based on the prerequisite information and electronically transmitting the meeting request including the prerequisite information based on the validation, otherwise restricting the scheduling of the meeting, wherein restricting the scheduling of the meeting includes not generating and electronically transmitting the meeting request;
wherein the validation further comprises determining a maximum threshold for a duration of the meeting;
comparing the maximum threshold to a duration of the meeting, wherein the duration of the meeting is based on the meeting agenda and the meeting objective prior to the start of the meeting; and
extending the duration of the meeting beyond the maximum threshold based on the comparison.

2. The computer-implemented method of claim 1, further comprising receiving the meeting agenda as a link, the computing system executes the link and analyzes content of the meeting agenda to determine whether the meeting agenda is relevant to the meeting objective; and responsive to determining the meeting agenda is irrelevant to the meeting objective, invalidating the meeting agenda.

3. The computer-implemented method of claim 1, further comprising designating a user as a meeting facilitator, otherwise designating a user that is scheduling the meeting as a default facilitator.

4. The computer-implemented method of claim 1, wherein a user is determined as a required participant based on the user's business profile and the meeting objective.

5. A system for calendaring dependencies, the system comprising:
   a storage medium, the storage medium being coupled to a processor;
   the processor configured to:
      receive prerequisite information for scheduling a meeting, the prerequisite information including a meeting agenda, meeting objective, and location;
      identify one or more participants having conflicting schedules for the meeting;
      prompt the one or more participants having conflicting schedules for the meeting with a real-time negotiation to determine an available time period for scheduling the meeting;
      validate, by a computing system, the prerequisite information based on an aggregate condition of the prerequisite information;
      designate a location of the meeting as a conference;
      receive log-in credentials associated with the conference;
      wherein the validation comprises validating, by the computer system, the conference by performing a test connection using the log-in credentials prior to transmitting a meeting request;
      respond to the validation, schedule the meeting based on the prerequisite information and electronically transmit the meeting request including the prerequisite information based on the validation, otherwise restricting the scheduling of the meeting, wherein restricting the scheduling of the meeting includes not generating and electronically transmitting the meeting request;
      wherein the validation further comprises the processor configured to determine a maximum threshold for a duration of the meeting;
      compare the maximum threshold to a duration of the meeting, wherein the duration of the meeting is based on the meeting agenda and the meeting objective prior to the start of the meeting; and
      extend the duration of the meeting beyond the maximum threshold based on the comparison.

6. The system of claim 5, comprising the processor further configured to receive the meeting agenda as a link, the computing system executes the link and analyzes content of the meeting agenda to determine whether the meeting agenda is relevant to the meeting objective; and responsive to determining the meeting agenda is irrelevant to the meeting objective, invalidate the meeting agenda.

7. The system of claim 5, comprising the processor being further configured to designate a user as a meeting facilitator, otherwise designate a user that is scheduling the meeting as a default facilitator.

8. A computer program product for calendaring dependencies, the computer program product comprising:
   a computer readable storage medium having stored thereon program instructions executable by a processor to cause the processor to:
      receive prerequisite information for scheduling a meeting, the prerequisite information including a meeting agenda, meeting objective, and location;
      identify one or more participants having conflicting schedules for the meeting;
      prompt the one or more participants having conflicting schedules for the meeting with a real-time negotiation to determine an available time period for scheduling the meeting;
      validate, by a computing system, the prerequisite information based on an aggregate condition of the prerequisite information;
      designate a location of the meeting as a conference;
      receive log-in credentials associated with the conference;
      wherein the validation comprises validating, by the computer system, the conference by performing a test connection using the log-in credentials prior to transmitting a meeting request;
      responsive to the validation, schedule the meeting based on the prerequisite information and electronically transmit the meeting request including the prerequisite information based on the validation, otherwise restrict the scheduling of the meeting, wherein restricting the scheduling of the meeting includes not generating and electronically transmitting the meeting request;
      wherein the validation further comprises the processor to determine a maximum threshold for a duration of the meeting;
      compare the maximum threshold to a duration of the meeting, wherein the duration of the meeting is based on the meeting agenda and the meeting objective prior to the start of the meeting; and
      extend the duration of the meeting beyond the maximum threshold based on the comparison.

9. The computer program product of claim 8, wherein the program instructions are further executable by a processor to cause the processor to receive the meeting agenda as a link, the computing system executes the link and analyzes content of the meeting agenda to determine whether the meeting agenda is relevant to the meeting objective; and responsive to determining the meeting agenda is irrelevant to the meeting objective, invalidate the meeting agenda.

10. The computer program product of claim 8, wherein the program instructions are further executable by a processor to cause the processor to designate a user as a meeting facilitator, otherwise designate a user that is scheduling the meeting as a default facilitator.

* * * * *